United States Patent
Siomina et al.

(12)

(10) Patent No.: US 9,026,094 B2
(45) Date of Patent: May 5, 2015

(54) METHOD AND APPARATUS FOR USE OF PERFORMANCE HISTORY DATA IN POSITIONING METHOD SELECTION

(75) Inventors: Iana Siomina, Solna (SE); Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 435 days.

(21) Appl. No.: 12/819,912

(22) Filed: Jun. 21, 2010

(65) Prior Publication Data

US 2011/0244879 A1 Oct. 6, 2011

Related U.S. Application Data

(60) Provisional application No. 61/318,995, filed on Mar. 30, 2010.

(51) Int. Cl.
*H04W 68/00* (2009.01)
*H04W 64/00* (2009.01)
(Continued)

(52) U.S. Cl.
CPC ............... *H04W 4/02* (2013.01); *G01S 5/0268* (2013.01); *H04W 4/028* (2013.01); *H04W 64/00* (2013.01)

(58) Field of Classification Search
USPC ................ 455/404.2, 414.2, 440, 441, 456.1, 455/456.2, 456.3, 456.5; 370/325, 252, 329
See application file for complete search history.

(56) References Cited

U.S. PATENT DOCUMENTS

| 7,376,430 B2 * | 5/2008 | Matsuda .................... 455/456.2 |
| 2001/0022558 A1 * | 9/2001 | Karr et al. ..................... 342/450 |
| 2002/0193121 A1 * | 12/2002 | Nowak et al. ................. 455/456 |

(Continued)

FOREIGN PATENT DOCUMENTS

EP 1443791 A1 8/2004

OTHER PUBLICATIONS

3rd Generation Partnership Project. 3GPP TS 36.455, V9.0.0 (Dec. 2009). 3rd Generation Partnership Project; Technical Specification Group Radio Access Network; Evolved Universal Terrestrial Radio Access (E-UTRA); LTE Positioning Protocol A (LPPa) (Release 9). Dec. 2009.

(Continued)

*Primary Examiner* — Kent Chang
*Assistant Examiner* — William Lu
(74) *Attorney, Agent, or Firm* — Coats & Bennett, PLLC

(57) ABSTRACT

A method of selecting the positioning method(s) used to respond to given positioning requests uses historical performance data reflecting the actual performance yielded by one or more of the positioning methods that are generally available for selection. As a non-limiting example, a positioning node maintains or otherwise has access to historical data reflecting the QoS obtained for at least some of the positioning methods supported by the node. Correspondingly, the node compares the QoS requirements associated with an incoming positioning request to the historical performance data, to identify the positioning method(s) that appear to best satisfy the requirements. The positioning node therefore selects the "best" method(s) for responding to a positioning request, not based on "generic" performance characteristics of those methods, but rather based on observed real-world performance of those methods, as applicable to the particular operating environment (radio environment) in which the positioning methods are carried out.

32 Claims, 4 Drawing Sheets

(51) Int. Cl.
*H04W 4/02* (2009.01)
*G01S 5/02* (2010.01)

(56) References Cited

U.S. PATENT DOCUMENTS

| | | | |
|---|---|---|---|
| 2004/0203926 A1* | 10/2004 | Ruutu et al. | 455/456.1 |
| 2004/0266457 A1* | 12/2004 | Dupray | 455/456.5 |
| 2007/0213074 A1* | 9/2007 | Fitch et al. | 455/456.2 |
| 2007/0247366 A1* | 10/2007 | Smith et al. | 342/464 |
| 2007/0270132 A1* | 11/2007 | Poosala | 455/414.2 |
| 2008/0081620 A1* | 4/2008 | Lu et al. | 455/435.1 |
| 2008/0167049 A1* | 7/2008 | Karr et al. | 455/456.2 |
| 2009/0005061 A1* | 1/2009 | Ward et al. | 455/456.1 |
| 2009/0117907 A1* | 5/2009 | Wigren | 455/440 |
| 2009/0143018 A1* | 6/2009 | Anderson et al. | 455/67.11 |
| 2009/0143076 A1* | 6/2009 | Wachter et al. | 455/456.1 |
| 2010/0041418 A1* | 2/2010 | Edge et al. | 455/456.2 |
| 2010/0120435 A1* | 5/2010 | Mia et al. | 455/440 |
| 2010/0195503 A1* | 8/2010 | Raleigh | 370/235 |
| 2010/0302965 A1* | 12/2010 | Catovic et al. | 370/252 |
| 2011/0111772 A1* | 5/2011 | Tysowski | 455/456.3 |
| 2011/0151839 A1* | 6/2011 | Bolon et al. | 455/414.1 |
| 2011/0159886 A1* | 6/2011 | Kangas et al. | 455/456.1 |

OTHER PUBLICATIONS

3rd Generation Partnership Project. 3GPP TS 36.413, V9.0.0 (Sep. 2009). 3rd Generation Partnership Project; Technical Specification Group Radio Access Network; Evolved Universal Terrestrial Radio Access Network (E-UTRAN); S1 Application Protocol (S1AP) (Release 9). Sep. 2009.

3rd Generation Partnership Project. 3GPP TS 36.355, V9.0.0 (Dec. 2009). 3rd Generation Partnership Project; Technical Specification Group Radio Access Network; Evolved Universal Terrestrial Radio Access (E-UTRA); LTE Positioning Protocol (LPP) (Release 9). Dec. 2009.

3rd Generation Partnership Project. 3GPP TS 36.305, V9.1.0 (Dec. 2009). 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9). Dec. 2009.

3rd Generation Partnership Project. 3GPP TS 25.413, V7.10.0 (Mar. 2009). 3rd Generation Partnership Project; Technical Specification Group Radio Access Network; UTRAN Iu interface RANAP signalling (Release 7). Mar. 2009.

3rd Generation Partnership Project. 3GPP TS 25.305, V7.4.0 (Sep. 2007). 3rd Generation Partnership Project; Technical Specification Group Radio Access Network; Stage 2 functional specification of User Equipment (UE) positioning in UTRAN (Release 7). Sep. 2007.

3rd Generation Partnership Project. 3GPP TS 23.271, V9.2.0 (Dec. 2009). 3rd Generation Partnership Project; Technical Specification Group Services and Systems Aspects; Functional stage 2 description of Location Services (LCS) (Release 9). Dec. 2009.

3rd Generation Partnership Project. 3GPP TS 23.032, V9.0.0 (Dec. 2009). 3rd Generation Partnership Project; Technical Specification Group Services and System Aspects; Universal Geographical Area Description (GAD) (Release 9). Dec. 2009.

* cited by examiner

METHOD AND APPARATUS FOR USE OF PERFORMANCE HISTORY DATA IN POSITIONING METHOD SELECTION

RELATED APPLICATIONS

This application claims priority under 35 U.S.C. §119(e) from the U.S. provisional patent application filed on 30 Mar. 2010 and identified by Application No. 61/318,995, and which is incorporated herein by reference.

FIELD OF THE INVENTION

The present invention generally relates to positioning operations in wireless communication, and particularly relates to a method and apparatus for improving the selection of the particular positioning method(s) used for responding to given positioning requests.

BACKGROUND

Positioning and related services are increasingly important to cellular network operators, network subscribers, advertisers, and others. Smart phones and other intelligent mobile devices with GPS receivers offer significant new opportunities for exploiting subscriber location information in various contexts. Some of these contexts relate to commercial activities, e.g., location-based marketing and advertising, while others relate to emergency services, law enforcement operations, and mobility management or other network-centric operations.

In turn, a given network may have a number of different positioning methods that are generally available to it, for use in responding to positioning requests. For example, the positioning methods generally available for use in positioning may include one or more GPS-based methods that rely on GPS satellite signals, along with one or more time-of-arrival and/or angle-of-arrival methods that rely on the reception of terrestrial radio signals at (or from) multiple network radio nodes fixed at known locations. Of course, these are non-limiting examples and the general point is that multiple positioning methods may be available at any given time, for responding to a given positioning request.

However, because the new service possibilities do not have uniform performance in terms of their accuracy, response time, etc., there is a need to accurately select the positioning method(s) to be used, to meet the applicable positioning Quality-of-Service (QoS) requirements that are associated with any given positioning request. Known positioning selection logic uses the requested positioning QoS (e.g., in terms of the requested positioning time, the requested (horizontal) accuracy and/or the requested vertical accuracy) in comparison with preconfigured, fixed positioning QoS values representing the performance of each of the various positioning methods. (Hereinafter, the use of "QoS" will be used to refer to "positioning QoS," unless otherwise noted.)

In particular, these stored QoS values generally are fixed or otherwise defined on a network-wide basis. That approach fails to recognize that a given positioning method may perform significantly better or worse, given the particulars of the operating environment in which it is applied.

SUMMARY

According to the teachings herein, positioning method selection uses historical performance data reflecting the actual performance yielded by one or more of the positioning methods that are generally available for selection. As a non-limiting example, a positioning node maintains or otherwise has access to historical data reflecting the actual QoS experienced at the node, for at least some of the positioning methods supported by the node. Correspondingly, the node compares the QoS requirements associated with an incoming positioning request to the historical performance data, to identify the positioning method(s) that appear to best satisfy the requirements. In this manner, a positioning node selects the "best" method or methods for responding to a positioning request, not based on the "generic" performance characteristics of those methods, but rather based on the observed, real-world performance of those methods, as applicable to the particular operating (radio) environments associated with the positioning node.

One embodiment of the present invention provides a method in a positioning node of a communication network, e.g., an E-SMLC in an LTE network. The method includes receiving a positioning request at the positioning node, and selecting one or more positioning methods for use in responding to the positioning request, based on comparing positioning performance requirements associated with the positioning request with historical positioning performance data maintained for positioning methods supported by the positioning node.

In at least one such embodiment, maintaining the historical positioning performance data at the positioning node is based on tracking actual positioning results obtained by the positioning node, in performing given ones of the supported positioning methods. In one embodiment, that tracking comprises maintaining historical values for at least one of horizontal accuracy, vertical accuracy, positioning response time, and availability, for individual ones of the supported positioning methods, or for combinations of the supported positioning methods. For example, the node maintains histogram information according to actual positioning results obtained over time at the positioning node, for individual ones of the positioning methods, or for combinations of them.

In another embodiment, the present invention provides a positioning node, for use in a communication network. The node comprises a communication interface configured to receive positioning requests and to return positioning responses, and one or more processing circuits configured to select one or more positioning methods for use in responding to the positioning request. In particular, the processing circuit(s) selects the positioning method(s) to use for responding to a given positioning request based on comparing positioning performance requirements associated with the positioning request with historical positioning performance data maintained for positioning methods supported by the positioning node.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
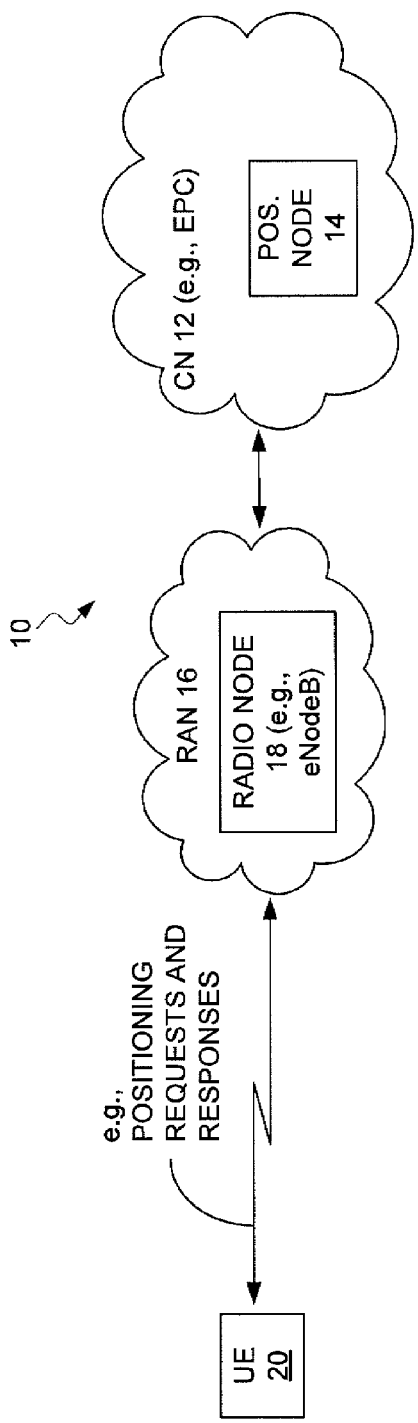
FIG. 1 is a block diagram of one embodiment of a wireless communication network, depicted in simplified form, and with an emphasis on the positioning node or nodes within that network.

FIG. 1 provides a simplified illustration of an example wireless communication network 10 in which the present invention is practiced. The Core Network (CN) 12 includes a positioning node 14. (In an LTE context, the CN 12 is referred to as an Evolved Packet Core, or EPC. Note, too, that the CN 12 generally includes mobility management entities, serving gateways, etc.) A Radio Access Network (RAN) 16 includes one or more radio nodes 18 (e.g., eNodeBs in an LTE context) and communicatively couples the CN 12 to a plurality of mobile terminals or other items of user equipment (UE). One UE 20 is illustrated for simplicity.

Those skilled in the art will appreciate that the RAN 16 generally will have multiple radio nodes 18 distributed over or within one or more geographic regions, with each node 18 providing radio service within one or more cells (which may be sectorized). Further, those skilled in the art will appreciate that the positioning requests/responses at issue in this disclosure may be transparent to some network nodes, e.g., to the depicted radio nodes 18, in which case the radio nodes 16 provide a mechanism for carrying positioning-related messages between user equipment (UEs) and positioning nodes.

Regardless, it is advantageously recognized herein that the general performance characteristics of given positioning methods may or may not be realized in actual implementation, depending upon the particular operating environment associated with a given positioning request. For example, while GPS or Assisted GPS (A-GPS) based positioning may, as a general proposition, yield the highest vertical and horizontal positioning accuracy, it may in practice be a poor choice for certain radio environments, such as in deep urban canyons in midtown Manhattan.

Figure 2:
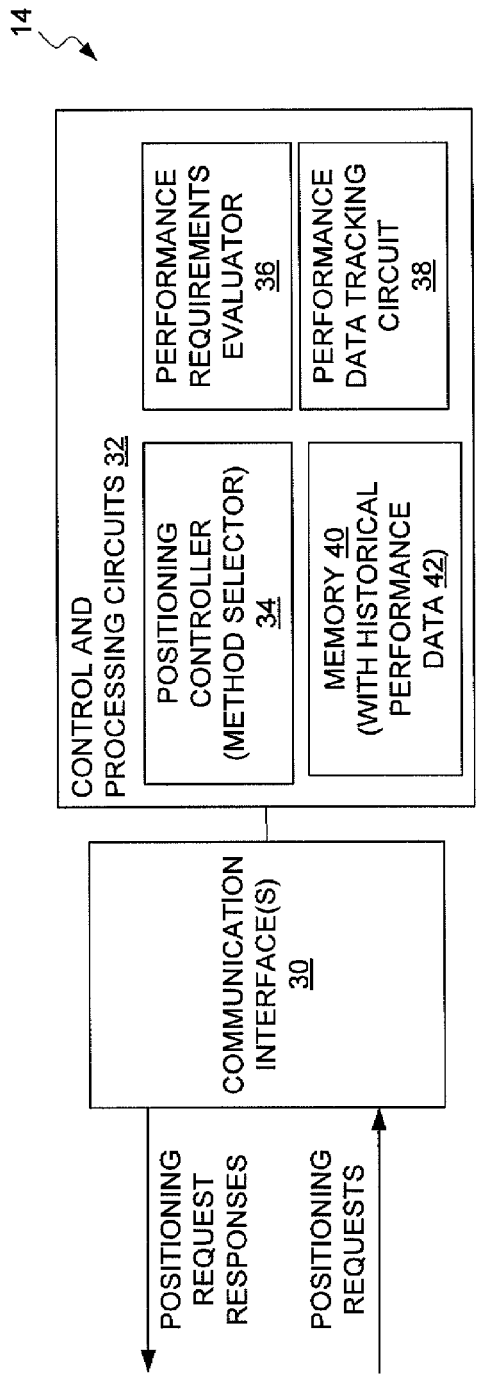
FIG. 2 is a block diagram for one embodiment of a positioning node that is, according to the teachings presented herein, configured to more intelligently select the positioning method(s) used to respond to given, incoming positioning requests, based on historical performance data that reflects the actual positioning performance experienced by the node for those method(s).

FIG. 2 illustrates an example positioning node 14 comprising one or more communication interfaces 30 configured to receive positioning requests and to return positioning responses, and one or more control and processing circuits 32. These circuits are configured to select one or more positioning methods for use in responding to the positioning request, based on comparing positioning performance requirements associated with any given positioning request with historical positioning performance data maintained for positioning methods supported by the positioning node 14.

Non-limiting examples of the positioning methods that may be supported by the positioning node 14 include cell coverage-based methods (e.g., using known service areas and cell IDs), Observed Time Difference of Arrival (in the uplink or downlink), Observed Angle of Arrival, GPS and/or A-GPS, or Assisted Global Navigation Satellite System (AGNSS), also referred to as AGNSS. Of course, every supported method will not necessarily be available for use for responding to a given positioning request. Further, the particular types of positioning methods supported by the node 14 will, to some extent, depend upon the type of wireless communication network 10 in which it is implemented.

In that regard, those skilled in the art will appreciate that the block diagrams of FIGS. 1 and 2 illustrate an example network 10 (e.g., LTE) and an example positioning node 14 that includes memory storing historical positioning performance data for the positioning methods implemented at the node 14. The positioning node 14 is, for example, implemented using microcontrollers and/or digital signal processors (or other type of digital processing circuitry) that are configured to carry out the methods and associated processing described herein (e.g., the processing method of FIG. 3), based on executing stored computer program instructions. It will be understood that, in this regard, the illustrated positioning node 14 is, in one or more embodiments, a machine that is specially adapted and particularly configured to carry out the method(s) taught herein, according to its execution of stored computer program instructions. Of course, those skilled in the art will appreciate that the positioning node 14 may be implemented in whole or in part using fixed circuitry, programmable circuitry, or some combination of both.

In an example configuration, the control and processing circuits 32 include a positioning controller 34, which may be functionally implemented in a digital signal processor or other digital processing circuitry according to the execution of computer program instructions, e.g., firmware and/or software. In at least one embodiment, the positioning controller 34 is configured to operate as the positioning method selector in cooperation with a performance requirements evaluator 36 that is configured to evaluate (e.g., compare) the positioning performance requirements associated with a given positioning request, in view of the historical performance yielded by one or more of the positioning methods supported by the positioning node 14. In at least one embodiment, the performance requirements evaluator takes the parameters representing the QoS required for a given positioning request and compares them individually, or in combination, with like parameters in historical performance data that represents the actual QoS experienced by the positioning node 14, for the supported positioning methods.

Supporting this evaluation and selection capability, the control and processing circuits 32 further include a performance data tracking circuit 38 that is configured to track the actual performances of the supported positioning methods. In at least one embodiment, the performance data tracking circuit 38 is configured to use memory 40 to store or otherwise maintain historical performance data 42. As an example, a positioning node 14 stores a data structure comprising (at least logically) a number of table rows and columns. Each row corresponds to a different positioning method, and each column corresponds to a different item of positioning method performance data, e.g., a different positioning method QoS parameter. Example parameters include the tracked success rate, the tracked response time, the tracked horizontal accuracy, and the tracked vertical accuracy. Note that the "success rate" for any given positioning method can be expressed as the number of times that the positioning method yielded results satisfying the positioning request requirements versus the overall number of times that the method has been invoked, in response to received positioning requests.

Further, in at least one embodiment, the data structure includes additional data columns that include time stamp data, reflecting the last time of execution for the given positioning methods and the data structure update for the corresponding data, for example. Additionally, second-order or other statistical data can be accumulated over time, based on the actual performance results obtained by positioning node 14 from its execution of the various positioning methods. Further, several data rows may be associated with a positioning method or their combination, where in one embodiment such rows are labeled, where a label may correspond to a certain network and/or traffic condition, e.g., time of the day, day of the week, working or public day, etc. Still further, in a system operating multiple radio access technologies (RATS), each row may also be associated with the corresponding RAT, i.e. several rows for the same method or their combination may be present with at least one row per RAT.

In any case, the historical performance data 42 reflects the actual performance experienced for one or more of the positioning methods supported by the positioning node 14 (e.g., over multiple executions by the node of given positioning methods). More generally, the performance data tracking circuit 38 is configured to maintain the historical positioning performance data at the positioning node 14, based on tracking actual positioning results obtained by the positioning node 14, in performing given ones of the supported positioning methods.

In at least one embodiment, the performance data tracking circuit 38 is configured to maintain historical values for at least one of horizontal accuracy, vertical accuracy, positioning response time, and availability, for individual ones of the supported positioning methods, or for combinations of the supported positioning methods. In this regard, it will be appreciated that the positioning node 14 responds to a given positioning request by selecting and carrying out a given positioning method, or by selecting and carrying out (or at least attempting) several positioning methods. The positioning node 14 selects more than one positioning method when, for example, an initially selected positioning method fails, or when it determines that a combination of positioning methods (executed in parallel or sequentially) will satisfy the performance requirements of a given positioning request better than would any single positioning method.

In at least one embodiment, the one or more processing circuits 32 of the positioning node 14 are configured to maintain different sets of historical values. As an example, the different sets of historical values correspond to one or more of the following: different carriers, in the case of multi-carrier operation; different radio-access-technologies or RATs, in the case that different positioning requests received at the positioning node may be associated with different RATs; UE speed and (if available) its uncertainty; and different times-of-day. Note that UE speed may be quantized into ranges—e.g., low and high, with a different performance data set (or subset of performance data) used for each range. Further, there may be different historical performance data (or different subsets of such data) for use with different radio environments—e.g., indoor versus outdoor. In this regard, the positioning node 14, for example, may be provisioned with information regarding which radio nodes serve indoor versus outdoor environments.

Regardless, in at least one embodiment, the performance data tracking circuit 38 is configured to maintain histogram information according to actual positioning results obtained over time at the positioning node, for individual ones of the positioning methods, or for combinations of them. The actual positioning results include, for example, one or more of horizontal accuracy, vertical accuracy, response time, and availability.

In at least one embodiment, the processing circuit(s) 32 are configured to calculate one or more QoS values at specified confidence levels, based on the histogram information maintained as the historical performance data 42. The circuitry 32 is further configured to compare the one or more calculated QoS values with the positioning performance requirements associated with a given positioning request, and correspondingly determine which positioning method or combination of methods best satisfies the positioning performance requirements.

Further, in at least one embodiment, the processing circuits 32 are configured to bias positioning method selection in favor of those positioning methods having historically higher availability, based on historic availability information, as included in said historical positioning performance data, or to exclude from consideration those positioning methods having historical availabilities that are below a given threshold. Thus, the processing circuits 32 in at least one such embodiment are configured to track positioning method availability, e.g., as a percentage availability.

Still further, in at least one embodiment, the positioning node 14 is configured to begin with a default or starting set of performance data for its supported positioning methods, and revise that data over time according to actual positioning performance obtained from performing the positioning methods over time at the node, to thereby obtain the historical positioning performance data. Here, "default" data comprises, for example, the kind of baseline performance data that is generically characteristic for a given positioning method—e.g., baseline accuracy values for GPS or time-of-arrival or angle-of-arrival positioning techniques. However, it should be understood that "starting" data may be that sort of default (generic) performance data, or it may be pre-existing historical performance data.

For example, a second positioning node 14 may be provisioned with historical performance data 42 developed by a first positioning node 14 in the network. That provisioned data would then be revised or otherwise updated over time at the second positioning node 14, based on the observed performance of the various positioning methods, as carried out by the second positioning node 14. This approach may work particularly well where the two positioning nodes 14 are "neighbors," such that the radio conditions applicable to positioning operations by the one node 14 might reasonably be assumed to apply to the other node 14.

When considering the processing examples detailed for the processing circuits 32, those skilled in the art will appreciate that the positioning node 14 may be implemented using microcontrollers and/or digital signal processors (or other computer processors) that are configured to carry out the methods and associated processing described herein, based on executing stored computer program instructions. It will be understood that, in this regard, the illustrated positioning node 14 is, in one or more embodiments, a machine that is specially adapted and particularly configured according to computer program execution, to perform the method(s) described herein.

Figure 3:
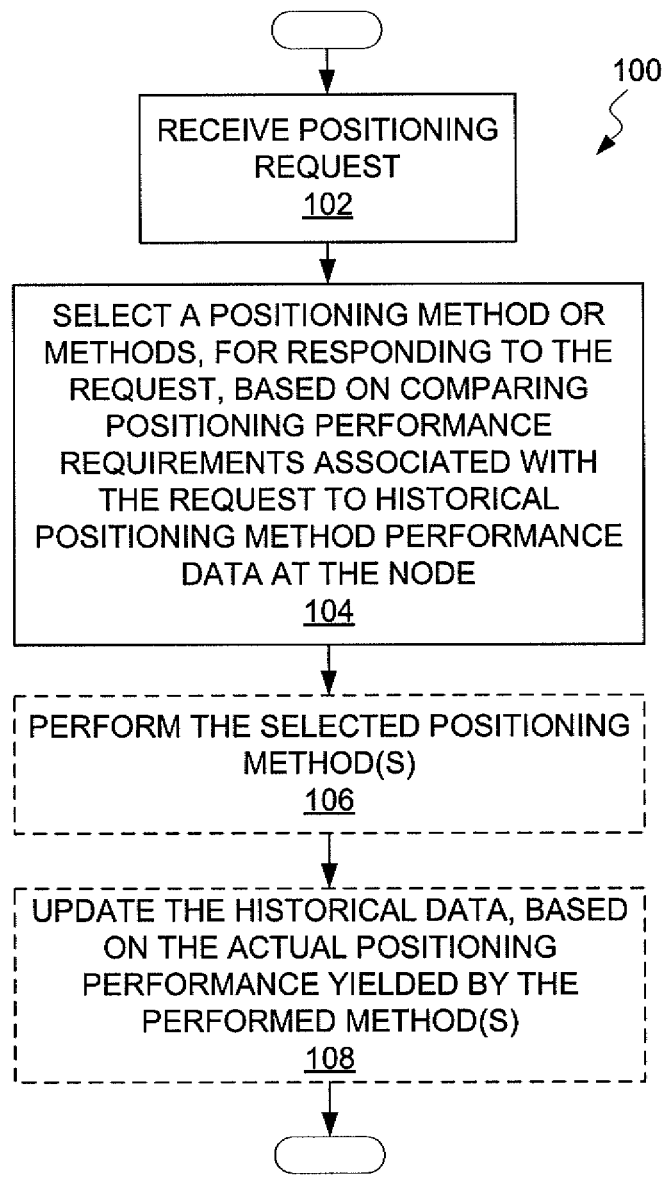
FIG. 3 is a logic flow diagram illustrating one embodiment of a method of positioning method selection, based on historical performance data.

For example, the method 100 of FIG. 3 may be carried out by the positioning node 14, based on its execution of stored computer program instructions—e.g., stored in the memory 40, or in another computer-readable medium within or otherwise accessible to the positioning node 14. Of course, at least some of the processing represented by the method 100 may be carried out by fixed circuitry within the positioning node 14.

Regardless, the illustrated method 100 includes receiving a positioning request (Step 102). The positioning node 14 then selects a positioning method (or methods) for responding to the request. In particular, the positioning node 14 selects the positioning method(s) based on comparing positioning performance requirements associated with the request to historical positioning method performance data at the positioning node 14 (Step 104). For example, the positioning node 14 looks at the values of one or more QoS parameters, as specified for the positioning request, and compares them to corresponding entries in the historical performance data 42. As a non-limiting example, a given positioning request may have a particular horizontal accuracy requirement and/or a particular response time requirement. According to the method 100, those values are compared in kind to the historical performance data 42, to identify the method (or combination or sequence of methods) that best satisfies the request requirements.

The illustrated method 100 continues with performing the selected positioning method(s) (Step 106), and may include the further step of updating the historical performance data 42 based on the actual positioning performance yielded by the performed method(s) (Step 108). That is, the positioning node 14 may use the positioning method availability data and the positioning results obtained for the current positioning request to update the historical performance data 42. Also, note that there may be an iterative aspect to the illustrated processing and that one or more of the method steps may be repeated or performed in a different order. For example, the positioning node 14 may select the best method initially, and then repeat selection processing if that method fails.

In any case, the positioning method selection as taught herein advantageously evaluates the positioning performance requirements of given positioning requests, against the actual (experienced) positioning performance yielded by the various positioning methods that are supported by the positioning node 14. Doing so is based on the advantageous recognition herein that a given positioning method might, as a general proposition applicable to most radio environments, be expected to outperform another given positioning method. However, in actual practice, the operating conditions prevailing in a given service area might result in the other positioning method being the better choice.

In the Universal Mobile Telephone System (UMTS) context, and, specifically, in the UMTS Terrestrial Radio Access Network or UTRAN context, the Radio Access Network Application Part or RANAP signaling protocol provides for location request signaling. According to certain specifications, location service requests shall include attributes such as LoCation Service (LCS) Client identity, LCS Client Type, and also, if needed, positioning priority, service identity and/or type, and requested QoS information. These provisions provide for specifying the QoS requirements to be met for a given positioning request, and provide the positioning node 14 with requirements data, for driving its positioning method selection process.

For example, the QoS required for a positioning request may be defined by one or more of the following: response time (values: delay tolerant/low delay), which is not mapped to time in the standard; accuracy code (encoded with 128 values), which is interpreted as the radius in meters of an uncertainty circle when decoded; vertical accuracy code (encoded with 128 values), which is interpreted as the size of the uncertainty interval. Furthermore, the message may also include positioning priority and Client Type information, which allows for configuring LCS QoS discrimination in a flexible way. Here, it is worth noting that there may exist some restrictions for certain LCS client types. For example, in the U.S., national interim standard TIA/EIA/IS-J-STD-036 restricts the geographic shape for an emergency services LCS client to minimally either an "ellipsoid point" or an "ellipsoid point with uncertainty circle and confidence."

Confidence also may be considered. In particular, owing to the nature of radio propagation, it is standard to adopt a statistical description of obtained positions, e.g., a statistical description for the obtained position of a mobile terminal or other UE. The confidence parameter is then used for description of the statistical error, the confidence being defined as the probability that the terminal is located in the interior of the reported region.

Confidence is obtained differently, for different statistical models. In A-GPS, the inaccuracy is caused by a combination of pseudo-range measurement errors and geometrical effects. Due to the excess measurements, the law of large numbers together with a linearization provides a motivation for the standard Gaussian position error model. For cell ID and TA positioning the error is rather caused by radio coverage effects. Hence a uniform statistical model for terminal location is used in these cases. Of particular interest herein, as regards confidence, it is the confidence value determined from the historical performance data 42 that is considered in the first positioning attempt.

In LTE, positioning performance requirements (required QoS) are signaled, for example, using the LTE Positioning Protocol (LPP). LPP is a point-to-point protocol used between a location server and a target device in order to position the target device using position-related measurements obtained by one or more reference sources. For LPP messages, a server could, for example, be an eSMLC in the control plane or an SLP in the user-plane, while a target could be a UE or a SET in the control and user planes, respectively.

Figure 4:
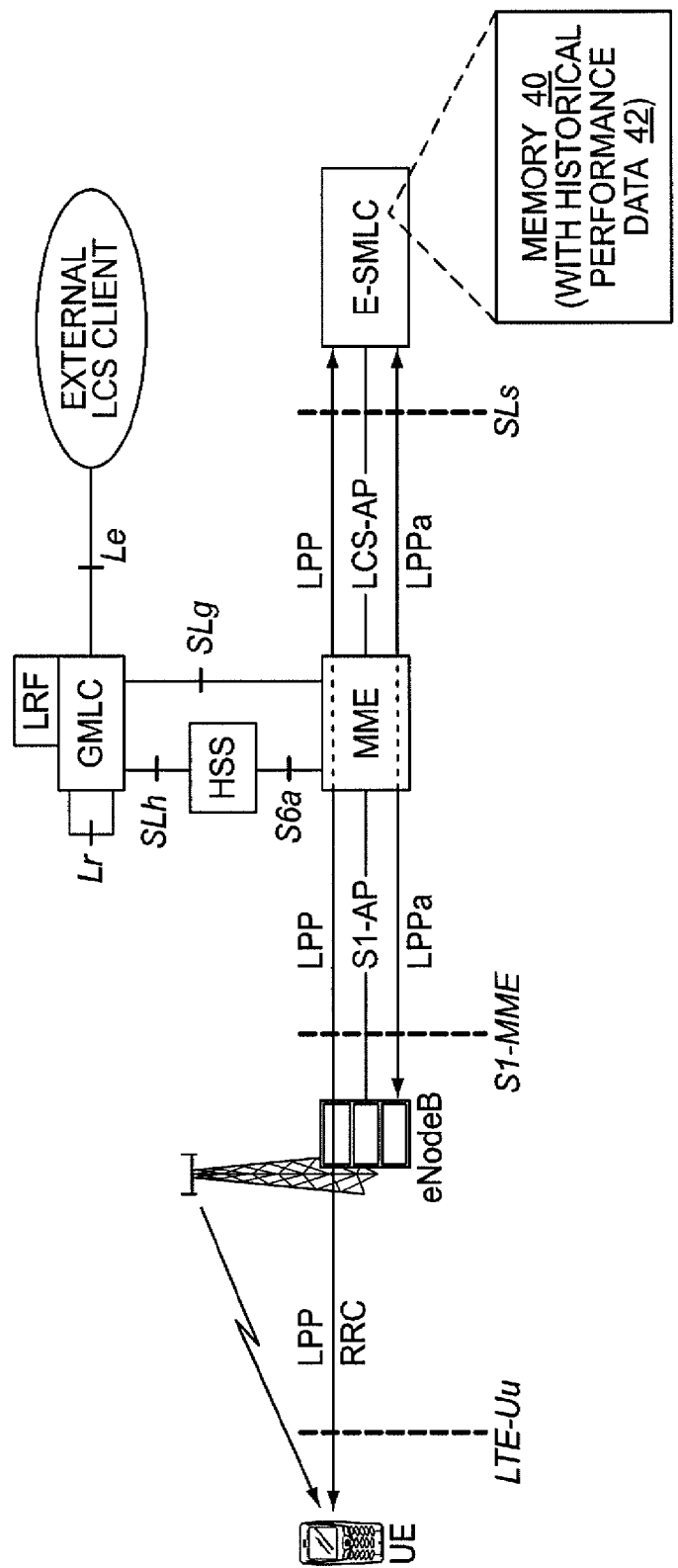
FIGS. 4 and 5 are control-plane and user-plane examples, respectively, of a positioning node within an LTE network.

In the control plane, LPP operates between target positioning device (e.g., a UE) and a positioning node, e.g., an E-SMLC. FIG. 4 illustrates a control-plane example, set in the context of LTE. One sees a UE communicating through an eNodeB via the Uu interface, and further sees a Mobility Management Entity (MME) supporting communications with an E-SMLC, as the positioning node 14.

For context, FIG. 4 further depicts a Home Subscriber Server (HSS), a Gateway Mobile Location Center (GMLC), a Location Routing Function (LRF), and an external LoCation Services (LCS) client. Note, too, that the example E-SMLC includes storage (e.g., memory 40) for storing historical positioning performance data 42—equivalently, the E-SMLC is in communication with a server or other data store that contains such information for the geographic area(s) of the communication network for which the E-SMLC provides positioning services.

Figure 5:
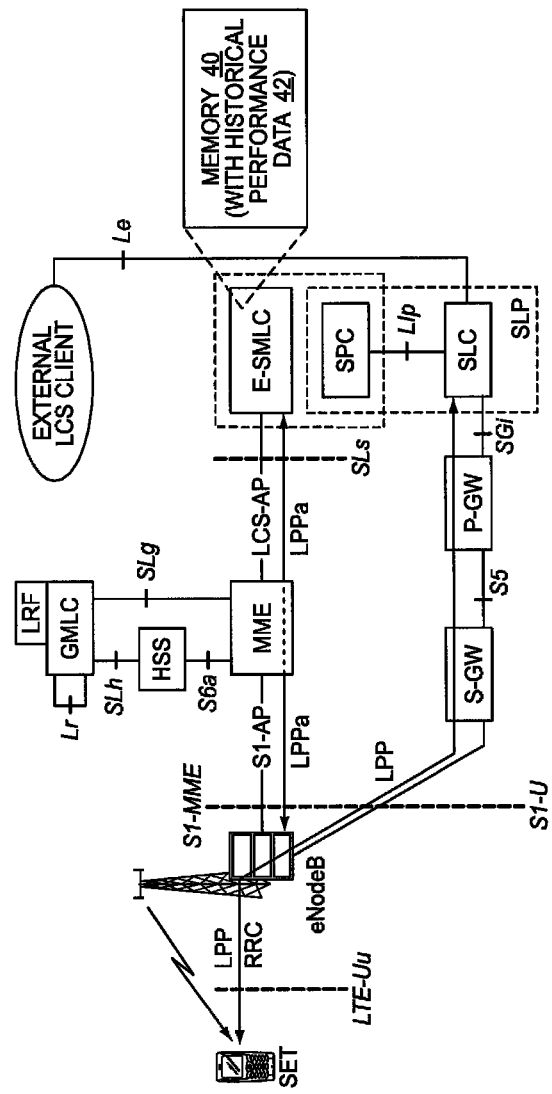

In contrast to the control-plane focus of FIG. 4, FIG. 5 provides a user-plane perspective on positioning, also set in the LTE context. One sees the MME, HSS, and GMLC/LRF, as before. Note, however, that the LPP is supported between the user equipment (SET) and an SLP (SUPL Location Center, where SUPL denotes Secure User Plane Location) through a Serving Gateway (S-GW) and a Packet Data Network Gateway (P-GW). The SLP includes a SUPL Location Center or SLC, and a SUPL Positioning Center or SPC, which has a (proprietary) interface to the E-SMLC, operating as the positioning node 14.

In any case, after an LCS session has been established, according to the current standard, the information related to LCS QoS (positioning QoS requirements) is retrieved during the LPP capability exchange and LPP location information transfer procedures, i.e. after the LCS session has been established. The LCS QoS may include the following information: horizontal accuracy (128 accuracy codes, 100 confidence codes, with the latter clearly defined only for A-GNSS); vertical coordinate request (boolean); vertical accuracy (128 accuracy codes, 100 confidence codes, with the latter clearly defined only for A-GNSS); response time (a value in range [1,128] seconds)—the maximum response time as measured between receipt of the Request Location Information and transmission of a Provide Location Information; and velocity (Boolean). In LTE, there are several velocity types, and, while the request values are Boolean (i.e. include/do not include), the responses include sets of values, for example, horizontal direction, speed, uncertainty, vertical direction, etc.

The positioning response time is one QoS parameter that often is of significant concern in positioning operations. The positioning node 14 therefore is, in one or more embodiments, configured to track the positioning response time of its respective positioning methods. For example, in one such embodiment, the positioning node 14 reads the system time, $T_1$, upon initiating a given positioning method, and reads the system time, $T_2$, upon the positioning method delivering a valid result. Positioning response time for that method, for that performance instance, is therefore computed as $\Delta T = T_2 - T_1$. The positioning node 14 then uses the computed value, $\Delta T$, to update the average positioning response time for the corresponding positioning method, or to update histogram data for positioning response time, or otherwise to adjust a tracking value that it maintains for the positioning response time parameter, for the particular positioning method.

As part of the proposed response time histograms, developed per positioning node and per positioning method, one embodiment proposes constructing the response time histogram by dividing the range of response times into bins $$[T_i, T_{i+1}], i=1,\ldots,n.$$

The histogram is then updated as follows, using the measured response time t(k)

$$h_i^t(k+1) = (1-\alpha)h_i^t(k) + \alpha, \text{if } t(k) \in [T_i, T_{i+1}], \text{and}$$

$$h_i^t(k+1) = (1-\alpha)h_i^t(k), \text{if } t(k) \notin [T_i, T_{i+1}],$$

where $$\text{Normalization} = \sum_{i=1}^{n} h_i^t(k+1),$$

and $$h_i^t(k+1) \triangleq h_i^t(k+1)/\text{Normalization}, i=1,\ldots,n.$$

Of course, those ordinarily skilled in the art will appreciate that other computational approaches may be used, to model a similar effect.

Horizontal accuracy is another QoS parameter of particular interest. The horizontal accuracy of a positioning event is addressed after applying any scaling to the confidence value requested for reporting. The horizontal accuracy sample for the specific positioning method and positioning node is then computed as $r_{QoS}$. Polygonal computation of horizontal accuracy may, as is known, be computed by first computing the area of the polygon with N vertices, or corners, as $$A = \frac{1}{2}\sum_{i=0}^{N-1}(x_i y_{i+1} - x_{i+1} y_i),$$

where the corners are given by $(x_i, y_i)^T$, $i=0,\ldots,N$ and where the corner with index $i=0$ and the corner with index $i=N$ coincide (i.e., one corner is repeated). The QoS measure is given by the radius of a circle with the same area as the polygon, i.e.

$$r_{QoS} = \sqrt{\frac{A}{\pi}}.$$

In an ellipsoid arc approach, the area of the ellipsoid arc is given by $$A = \frac{\theta_{Included}}{360}(\pi(R+\Delta R)^2 - \pi R^2),$$

where $\theta_{Included}$ is the opening angle of the arc measured in degrees, R is the inner radius of the arc and $\Delta R$ is the thickness of the arc. The QoS measure then becomes $$r_{QoS} = \sqrt{\frac{\theta_{Included}}{360}\Delta R(2R+\Delta R)}.$$

In the approach referred to as the "ellipsoid point with uncertainty circle," the QoS information is given by the radius of the uncertainty circle. In another approach, referred to as "ellipsoid point with uncertainty ellipse," the area of the ellipse is $$A = \pi ab,$$

where a is the semi-major axis and b is the semi-minor axis. The QoS measure then becomes $$r_{QoS} = \sqrt{ab}.$$

Finally, in the "ellipsoid point with altitude and uncertainty ellipsoid" approach, the area of the ellipse in the horizontal plane is $$A = \pi ab,$$

where a is the semi-major axis and b is the semi-minor axis. The QoS measure then becomes $$r_{QoS} = \sqrt{ab}.$$

Regardless of the approach(es) used for computing horizontal accuracy, a horizontal accuracy average or histogram is developed by the positioning node 14, over repeated executions of the various positioning methods supported by it. Historical values for horizontal accuracy are thus included per positioning method and/or method combination in the historical performance data 42, as maintained by the positioning node 14.

As for horizontal accuracy histograms, such data may be developed in the wireless communication network 10 on per-positioning-node and per-positioning-method basis. That is, individual ones among two or more positioning nodes 14 may be configured to develop their own historical performance data 42, based on the QoS results experienced by that node, for its various positioning methods and/or combinations of positioning methods.

One such construction method divides the range of the horizontal inaccuracy into bins, such as $$[r_i, r_{i+1}], i=1,\ldots,n.$$

The histogram is then updated as follows, using the measured horizontal inaccuracy $r_{QoS}(k)$ as $$h_i^r(k+1) = (1-\alpha)h_i^r(k) + \alpha, \text{if } r_{QoS}(k) \in [r_i, r_{i+1}],$$

and $$h_i^r(k+1) = (1-\alpha)h_i^r(k), \text{if } r_{QoS}(k) \notin [r_i, r_{i+1}].$$

Further, with $$\text{Normalization} = \sum_{i=1}^{n} h_i^r(k+1),$$

$h_i^r(k+1) \square h_i^r(k+1)/\text{Normalization}, i=1,\ldots,n.$

Of course, those ordinarily skilled in the art will appreciate that other computational approaches may be used to similar effect.

Vertical accuracy is another QoS parameter of particular interest. The vertical accuracy is given directly by the vertical accuracy of the format itself, i.e. no computation is required. The positioning node 14 is configured to track vertical accuracy, as actually obtained via the execution of given positioning methods by the positioning node 14. A vertical accuracy average or histogram is thus developed by the positioning node 14 and tracked as part of the historical performance data 42, over repeated executions of the various positioning methods supported by it.

As for vertical accuracy histograms, in one or more embodiments, per positioning node and positioning methods proposed herein construct the histogram for vertical accuracy by dividing the range of vertical accuracy into bins, such as $[v_i, v_{i+1}], i=1,\ldots,n.$ The histogram is then updated as follows, using the measured vertical accuracy $v_{QoS}(k)$, $h_i^v(k+1) = (1-\alpha)h_i^v(k) + \alpha, \text{if } v_{QoS}(k) \in [v_i, v_{i+1}]$ and $h_i^v(k+1) = (1-\alpha)h_i^v(k), \text{if } v_{QoS}(k) \notin [v_i, v_{i+1}]$ Further, with $$\text{Normalization} = \sum_{i=1}^{n} h_i^v(k+1),$$

$h_i^v(k+1) \square h_i^v(k+1)/\text{Normalization}, i=1,\ldots,n.$

Of course, those ordinarily skilled in the art will appreciate that other computational approaches may be used, to similar effect.

Availability is another QoS parameter of interest, and it is tracked by the positioning node 14 in one or more embodiments. In at least one such embodiment, the positioning node 14 maintains availability information in the historical performance data 42 based on the following approach: if the positioning node 14 initiates a given positioning method, e.g., in response to an incoming positioning request, and that method delivers a correct result, then the following variables for that method are updated: method_success=method_success+1, and method_total=method_total+1. (The positioning node 14 may maintain a set of such variables, for all of the positioning methods supported by it.) In case of failure, only total is updated. Other alternatives are also possible, e.g., a leaky integrating filter can be used in order to discard old data, thereby achieving adaptation over time.

For the construction of experimentally achieved prior QoS information and availability, the experimentally-achieved QoS information preferably is expressed per positioning node. In principle, nothing prevents a build-up per cell of the same information. If that approach is impractical in the positioning node 14, then distributed data maintenance is possible, at the expense of additional signaling and interface adaptation. Data collection times can be a problem, at least in some types of networks, and under some conditions. However, it is contemplated herein that "training periods" are used in at least some embodiments, to completely or partly develop the historical performance data 42.

As for availability percentages on a per positioning node and positioning method basis, any given positioning node 14 may include logic processing circuitry configured to follow the above histogram update principle. For example, the availability for a specific positioning method in a positioning node can be updated as $$a(k+1) = (1-\alpha)a(k) + \alpha\left(\frac{\text{success}(k)}{\text{total}(k)}\right).$$

As for using experimentally achieved prior QoS and availability information—broadly referred to as historical performance data 42—the teachings herein present a number of non-limiting examples. For example, one or more embodiments of a positioning node 14 include logical processing circuitry that is configured to use the histogram information to compute the corresponding experimentally achieved prior (historic) QoS parameter, at a specific confidence level.

With the above in mind, the present invention provides a method and apparatus for using historical performance data 42 to select the particular positioning method or methods that a positioning node 14 uses to respond to a given positioning request. That is, a positioning node 14 receives a positioning request that includes or is associated with specified values for one or more QoS parameters, such as response time and horizontal and/or vertical accuracy, and it evaluates those requirements in view of the historical performance actually obtained by it for particular ones of the positioning methods supported by it (or for combinations of them). This allows the positioning node 14 to make a more intelligent selection of the positioning method(s) it uses to respond to given incoming positioning requests, as compared to conventional approaches that rely on static, pre-configured performance values.

Note, too, that a positioning node 14 may start with a preconfigured, default set of positioning method performance data, and then dynamically revise or expand that data, over time, based on tracking actual positioning method performance (including availability). In this regard, and as a further point of inventiveness, the preconfigured data may be actual positioning performance data previously generated, e.g., from a like area, etc. In a particular embodiment, historical performance data 42 from one positioning node 14 is used as the starting data for another positioning node 14. That other positioning node 14 then updates that starting data over time, as it responds to incoming positioning requests, so that it begins reflecting the actual performance experienced by that other node 14, for the various positioning methods.

While the exchange of historical performance data 42 may be between the same types of positioning nodes 14, e.g., two control-plane or two user-plane positioning nodes, other arrangements are contemplated herein. For example, the historical performance data 42 developed for a control-plane positioning node (one type of positioning node 14) can be used to provision a user-plane positioning node (another type of positioning node 14), or vice versa. Such provisioning provides the provisioned node with geographically relevant data reflecting the positioning performance history actually realized for various ones of the supported positioning methods. Note, too, that in one or more embodiments, a user-plane positioning node 14 is configured to exchange or otherwise share historical performance data 42 with a control-plane positioning node 14.

Thus, it will be appreciated that a positioning node 14 as contemplated herein includes one or more communication interfaces configured to receive or otherwise exchange historical performance data 42. In one such embodiment, the positioning node 14 is configured to exchange data with another node in the same plane (e.g., with another node in the control plane, if the positioning node 14 is a control-plane node, or with another node in the user plane, if the positioning node 14 is a user-plane node). However, in the same or another embodiment, the positioning node 14 includes a communication interface that is configured for the exchange of such data between planes (e.g., to or from a control-plane node, if the positioning node 14 is a user-plane node, or to or from a user-plane node, if the positioning node 14 is a control-plane node).

In at least one embodiment, a given positioning node 14 is configured with the historical performance data 42 from a neighbor node, or from some centralized database that has access to appropriate performance history data 42. In this regard, it will be appreciated that a given positioning node 14 is, in one or more embodiments, configured to communicate directly or indirectly with such a neighboring node or with a centralized node. For example, the positioning node 14 includes one or more communication interfaces and associated control and processing circuits 32, which may be configured to receive and process such data.

With the above in mind, example non-limiting advantages of the present invention include significantly more accurate selection of at least the first positioning method(s) initially selected by a positioning node 14, for responding to any given positioning request. "Accuracy" of selection means a more appropriate matching of the QoS requirements of the request with the QoS performance of various positioning methods supported by the positioning node 14, based on observing the real-world, actual performance of those methods at the node. In this manner, the positioning node's selection of positioning method(s) becomes "tuned" or otherwise responsive to the radio environments served by the node (as represented in the historic performance data 42). The present invention also enhances the flexibility of using the historic performance data 42, in that it allows full use of the requested confidence.

While the present invention has been explained and fully enabled using multiple detailed examples herein, the interested reader may find it useful to refer to a number of related "background" references. Examples of such references include: 3GPP, TS 25.413, "UTRAN Iu interface RANAP signaling"; 3GPP, TS 36.413, V9.0.0, "Evolved Universal Terrestrial Radio Access Network (E-UTRAN); S1 Application Protocol (S1AP)," September 2009; 3GPP, TS 25.305, "Stage 2 functional specification of UE positioning in UTRAN"; 3GPP 36.355, "Evolved Universal Terrestrial Radio Access (E-UTRA); E-UTRA, LTE Positioning Protocol (LPP)," December 2009; 3GPP 36.455, V2.0.0 "Evolved Universal Terrestrial Radio Access (E-UTRA); LTE Positioning Protocol A (LPPa)," December 2009; 3GPP 36.305, "Evolved Universal Terrestrial Radio Access (E-UTRA); Stage 2 functional specification of User Equipment (UE) positioning in E-UTRAN"; 3GPP TS 23.032, "Universal Geographical Area Description (GAD"; and 3GPP TS 23.271, "Functional Stage 2 Description of Location Services (LCS)".

Finally, modifications and other embodiments of the disclosed invention(s) will come to mind to one skilled in the art having the benefit of the teachings presented in the foregoing descriptions and the associated drawings. For example, the present invention applies directly to any number of network types, including LTE and UMTS (using any of WCDMA, TD-CDMA, and TD-SCDMA), and also to CDMA2000 and other such CDMA variants. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a positioning node of a communication network, the method comprising:
receiving different positioning requests at the positioning node associated with different confidence levels;
obtaining different positioning Quality-of-Service (QoS) values at the different confidence levels associated with the different requests, for different positioning methods supported by the positioning node, based on historical positioning performance data maintained for those positioning methods; and
selecting one or more positioning methods for use in responding to each of the different positioning requests, based on comparing a positioning QoS value required by that positioning request with the positioning QoS values obtained for the different positioning methods at the confidence level associated with that positioning request;
wherein the historical positioning performance data is maintained for a given positioning method at a confidence level different than that associated with a given positioning request, and wherein positioning QoS value are obtained at the confidence level associated with said given positioning request for said given positioning method by scaling the historical positioning performance data maintained for that method to that confidence level.

2. The method of claim 1, further comprising maintaining the historical positioning performance data at the positioning node based on tracking actual positioning results obtained by the positioning node, in performing given ones of the supported positioning methods.

3. The method of claim 2, wherein said tracking comprises maintaining historical values for at least one of horizontal accuracy, vertical accuracy, positioning response time, success rate, failure rate, and availability, for individual ones of the supported positioning methods, or for combinations of the supported positioning methods.

4. The method of claim 3, further comprising maintaining different sets for said historical values, corresponding to different carriers, in the case of multi-carrier operation.

5. The method of claim 2, wherein said tracking comprises maintaining histogram information according to actual positioning results obtained over time at the positioning node, for individual ones of the positioning methods, or for combinations of them, said actual positioning results including one or more of horizontal accuracy, vertical accuracy, response time, and availability.

6. The method of claim 5, wherein said obtaining comprises obtaining different positioning Quality-of-Service (QoS) values, for each positioning method or combination of methods, based on the histogram information maintained for that method or combination, and wherein selecting one or more positioning methods for use in responding to a given positioning request comprises determining which positioning method or combination of methods best satisfies the positioning QoS value required by the given positioning request based on said comparing.

7. The method of claim 1, wherein said selecting includes biasing positioning method selection in favor of those positioning methods having historically higher availability, based on historic availability information, as included in said historical positioning performance data, or, includes excluding from consideration those positioning methods having historical availabilities that are below a given threshold.

8. The method of claim 1, further comprising beginning with a default or starting set of performance data for the supported positioning methods, and revising that data over time according to actual positioning performance obtained from performing the positioning methods over time at the node, to thereby obtain the historical positioning performance data.

9. The method of claim 8, wherein the positioning node is configured for operation within a control-plane of the communication network, or is configured for operation within a user-plane of the communication network, and wherein the method further comprises receiving the default or starting set of performance data at the positioning node, from another node in the same plane as the positioning node.

10. The method of claim 8, wherein the positioning node is configured for operation within a control-plane of the communication network, or is configured for operation within a user-plane of the communication network, and wherein the method further comprises receiving the default or starting set of performance data at the positioning node from another node not in the same plane as the positioning node, such that the default or starting set of performance data is exchanged between nodes in the control and user planes.

11. A positioning node of a communication network comprising:
a communication interface configured to receive different positioning requests associated with different confidence levels and to return different respective positioning responses; and
one or more processing circuits configured to:
obtain different positioning Quality-of-Service (QoS) values at the different confidence levels associated with the different requests, for different positioning methods supported by the positioning node, based on historical positioning performance data maintained for those positioning methods; and
select one or more positioning methods for use in responding to each of the different positioning requests, based on comparing a positioning QoS value required by that positioning request with the positioning QoS values obtained for the different positioning methods at the confidence level associated with that positioning request;
wherein the historical positioning performance data is maintained for a given positioning method at a confidence level different than that associated with a given positioning request, and wherein the one or more processing circuits are configured to obtain a positioning QoS value at the confidence level associated with said given positioning request for said given positioning method by scaling the historical positioning performance data maintained for that method to that confidence level.

12. The positioning node of claim 11, wherein the one or more processing circuits includes a tracking circuit configured to maintain the historical positioning performance data at the positioning node based on tracking actual positioning results obtained by the positioning node, in performing given ones of the supported positioning methods.

13. The positioning node of claim 12, wherein said tracking circuit is configured maintain historical values for at least one of horizontal accuracy, vertical accuracy, positioning response time, success rate, failure rate, and availability, for individual ones of the supported positioning methods, or for combinations of the supported positioning methods.

14. The positioning node of claim 13, wherein the one or more processing circuits are configured to maintain different sets for said historical values, corresponding to different carriers, in the case of multi-carrier operation.

15. The positioning node of claim 12, wherein said tracking circuit is configured to maintain histogram information according to actual positioning results obtained over time at the positioning node, for individual ones of the positioning methods, or for combinations of them, said actual positioning results including one or more of horizontal accuracy, vertical accuracy, response time, and availability.

16. The positioning node of claim 15, wherein said one or more processing circuits are configured to obtain different positioning Quality-of-Service (QoS) values, for each positioning method or combination of methods, based on the histogram information maintained for that method or combination, and to select one or more positioning methods for use in responding to a given positioning request by determining which positioning method or combination of methods best satisfies the positioning QoS value required by the given positioning request based on said comparing.

17. The positioning node of claim 11, wherein said one or more processing circuits are configured to bias positioning method selection in favor of those positioning methods having historically higher availability, based on historic availability information, as included in said historical positioning performance data, or to exclude from consideration those positioning methods having historical availabilities that are below a given threshold.

18. The positioning node of claim 11, wherein the positioning node is configured to begin with a default or starting set of performance data for the positioning methods, and revise that data over time according to actual positioning performance obtained from performing the positioning methods over time at the node, to thereby obtain the historical positioning performance data.

19. The positioning of claim 18, wherein the positioning node is configured for operation within a control-plane of the communication network, or is configured for operation within a user-plane of the communication network, and wherein the positioning node includes a communication interface configured for receiving the default or starting set of performance data at the positioning node, from another node in the same plane as the positioning node.

20. The positioning node of claim 18, wherein the positioning node is configured for operation within a control-plane of the communication network, or is configured for operation within a user-plane of the communication network, and wherein the positioning node further comprises a communication interface configured for receiving the default or starting set of performance data at the positioning node from another node not in the same plane as the positioning node, such that the default or starting set of performance data is exchanged between nodes in the control and user planes.

21. The method of claim 3, further comprising maintaining different sets for said historical values, corresponding to different user equipment speeds or ranges of speed.

22. The method of claim 3, further comprising maintaining different sets for said historical values, corresponding to different radio environment types.

23. The method of claim 3, further comprising maintaining different sets for said historical values, corresponding to different radio-access-technologies or RATs, in the case that different positioning requests received at the positioning node may be associated with different RATs.

24. The method of claim 3, further comprising maintaining different sets for said historical values, corresponding to different times-of-day.

25. The positioning node of claim 13, wherein the one or more processing circuits are configured to maintain different sets for said historical values, corresponding to different user equipment speeds or ranges of speed.

26. The positioning node of claim 13, wherein the one or more processing circuits are configured to maintain different sets for said historical values, corresponding to different radio environment types.

27. The positioning node of claim 13, wherein the one or more processing circuits are configured to maintain different sets for said historical values, corresponding to different radio-access-technologies or RATs, in the case that different positioning requests received at the positioning node may be associated with different RATs.

28. The positioning node of claim 13, wherein the one or more processing circuits are configured to maintain different sets for said historical values, corresponding to different times-of-day.

29. The method of claim 1, wherein the historical positioning performance data maintained for a given positioning method is data that reflects the actual performance historically experienced for that positioning method over multiple executions of the method by the positioning node.

30. The method of claim 1, further comprising performing the one or more selected positioning methods and responding to each of the different positioning requests with the results of said performance.

31. The positioning node of claim 11, wherein the historical positioning performance data maintained for a given positioning method is data that reflects the actual performance historically experienced for that positioning method over multiple executions of the method by the positioning node.

32. The positioning node of claim 11, wherein the one or more processing circuits are configured to perform the one or more selected positioning methods and respond to each of the different positioning requests with the results of said performance.

* * * * *

UNITED STATES PATENT AND TRADEMARK OFFICE
CERTIFICATE OF CORRECTION

PATENT NO. : 9,026,094 B2
APPLICATION NO. : 12/819912
DATED : May 5, 2015
INVENTOR(S) : Siomina et al.

Page 1 of 1

It is certified that error appears in the above-identified patent and that said Letters Patent is hereby corrected as shown below:

In the Specification

In Column 5, Line 2, delete "(RATS)," and insert -- (RATs), --, therefor.

In Column 11, Line 31, delete " $if\ v_{QoS}(k) \in [v_i, v_{i+1}]$ ," and insert -- $if\ v_{QoS}(k) \in [v_i, v_{i+1}],$ --, therefor.

In the Claims

In Column 16, Line 6, in Claim 13, delete "configured maintain" and insert -- configured to maintain --, therefor.

In Column 16, Line 47, in Claim 19, delete "of claim" and insert -- node of claim --, therefor.

Signed and Sealed this
First Day of March, 2016

Michelle K. Lee
*Director of the United States Patent and Trademark Office*